April 8, 1969  H. S. WILLE ET AL  3,437,055
CARGO SUPPORTING ARRANGEMENT
Filed April 6, 1967  Sheet 1 of 3
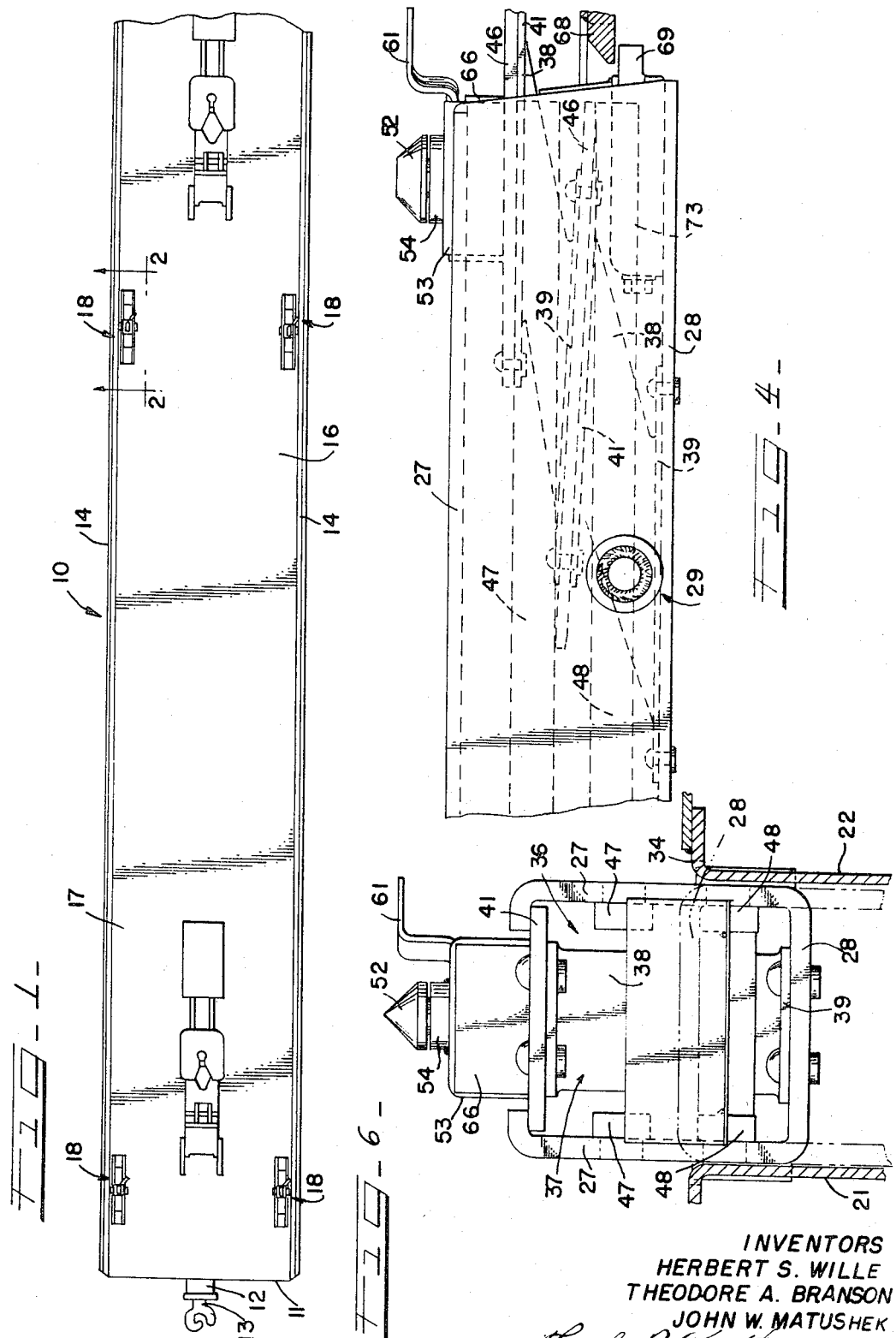
INVENTORS
HERBERT S. WILLE
THEODORE A. BRANSON
JOHN W. MATUSHEK
BY Fred P. Kostka
ATT'Y.

April 8, 1969
H. S. WILLE ET AL
3,437,055
CARGO SUPPORTING ARRANGEMENT
Filed April 6, 1967
Sheet 2 of 3
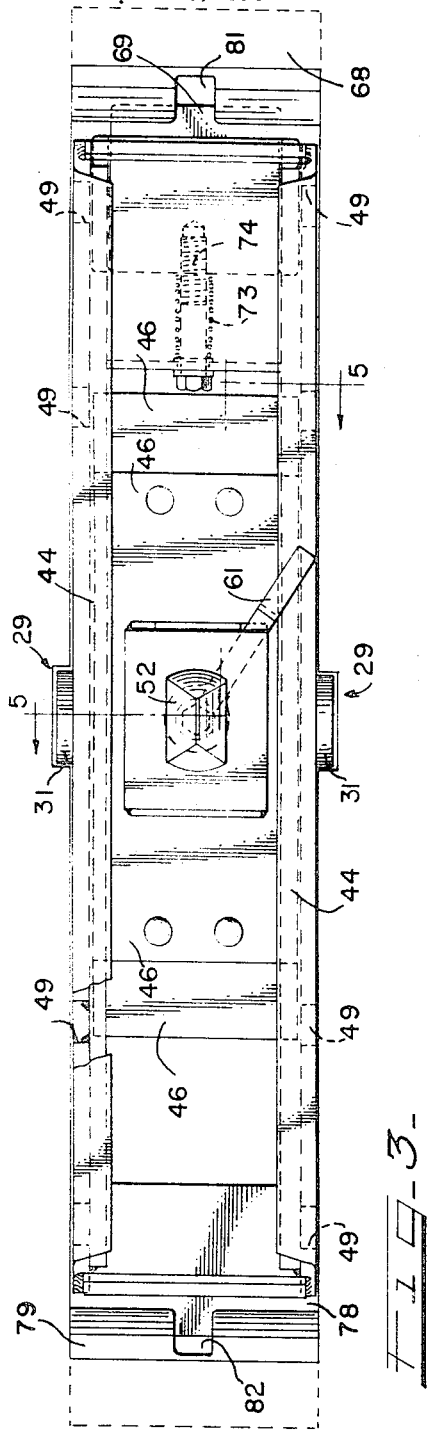
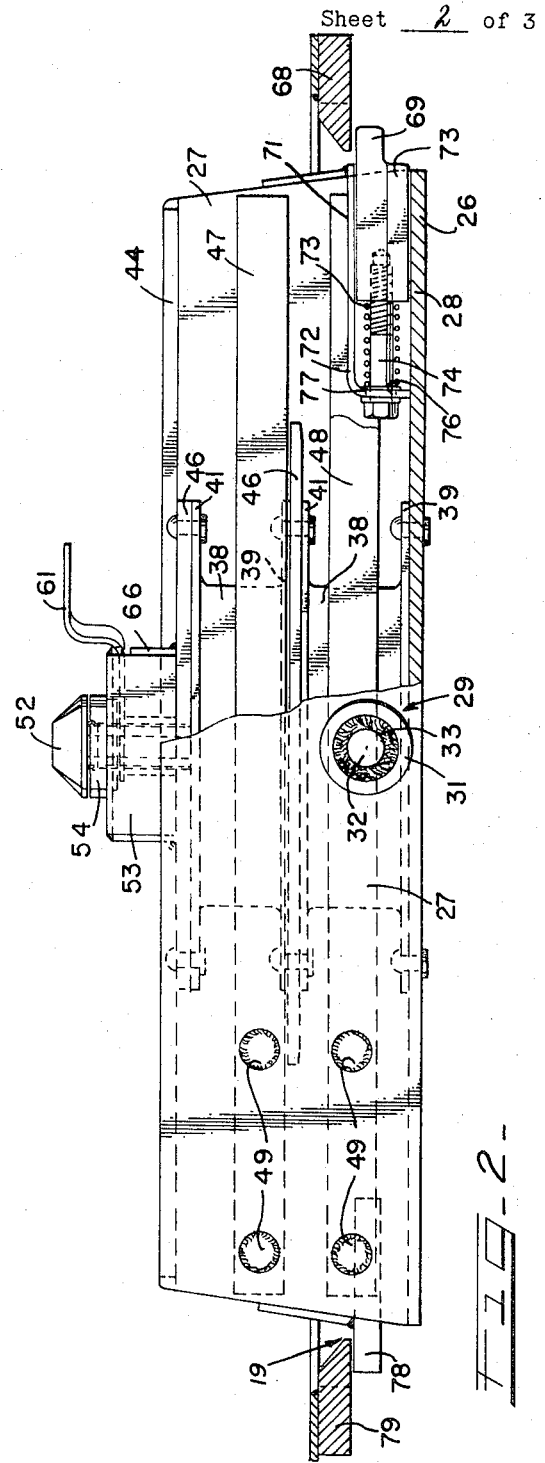
INVENTORS
HERBERT S. WILLE
THEODORE A. BRANSON
JOHN W. MATUSHEK
BY Fred H. Kostka
ATT'Y.

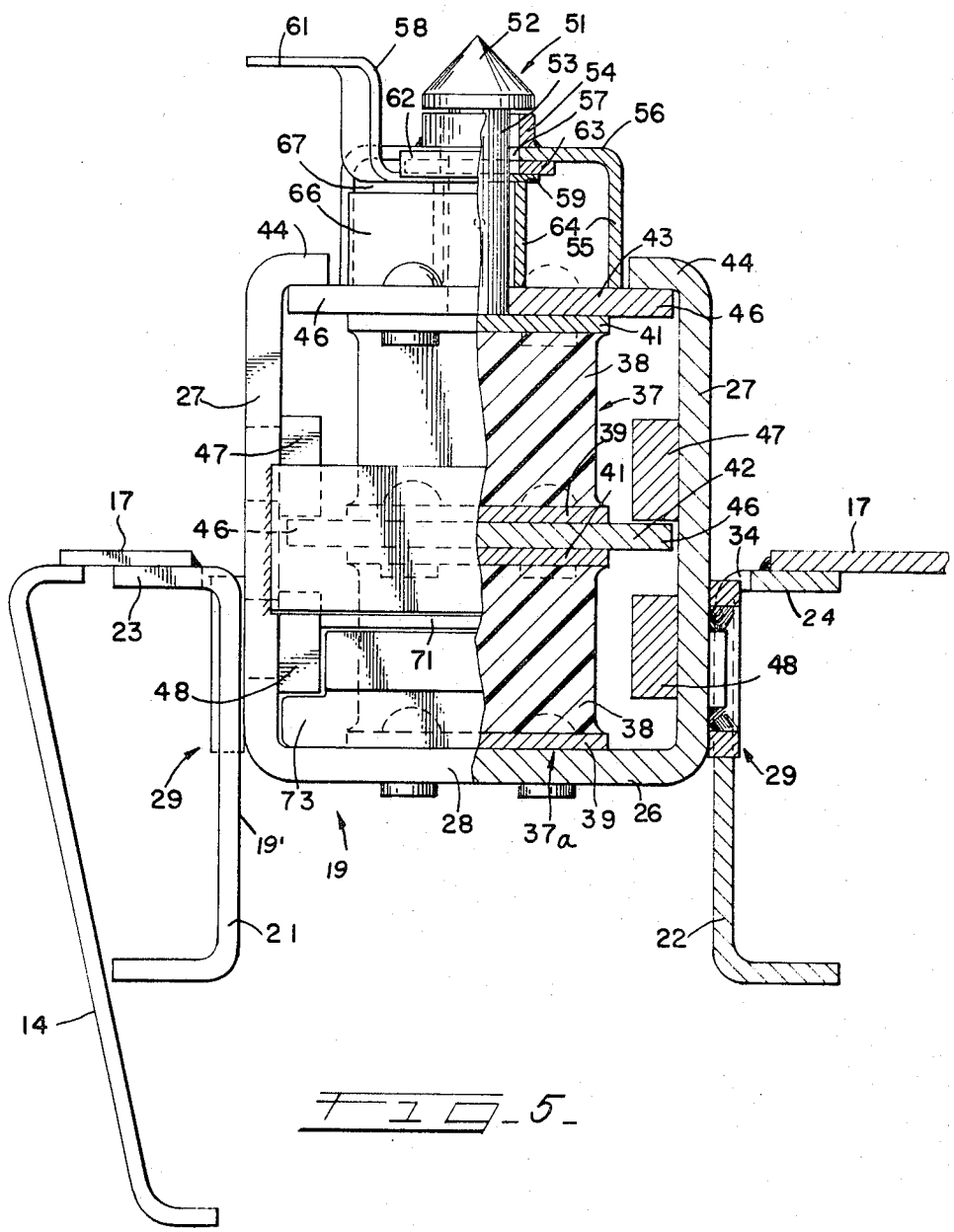

United States Patent Office 3,437,055
Patented Apr. 8, 1969

3,437,055
CARGO SUPPORTING ARRANGEMENT
Herbert S. Wille, Homewood, Theodore A. Branson, Calumet City, and John W. Matushek, Harvey, Ill., assignors to Pullman Incorporated, Chicago, Ill., a corporation of Delaware
Filed Apr. 6, 1967, Ser. No. 628,855
Int. Cl. B65j 1/22; B60p 7/08
U.S. Cl. 105—366                                  9 Claims

ABSTRACT OF THE DISCLOSURE

A railway vehicle of the flat deck type which is adapted to transport various forms of cargo such as semi-trailers, containers and the like. A container support arrangement is incorporated into the treadway area of the floor of the railway vehicle and includes a support bracket having a cargo attachment means mounted thereon. The support bracket is mounted in an opening in the floor located in the treadway area thereof and includes a planar surface. The mounting arrangement includes a pivot means for turning the bracket so that the planar surface thereon is disposed substantially coplanar with the treadway areas when the cargo attachment means is in a stored position.

Background of the invention

The cargo tie down arrangement of the present invention is intended primarily for retaining containers on the car during transit. The flat deck railway vehicles are also utilized for the purpose of transporting semi-trailers which are hitches to the railway vehicles by means of collapsible fifth wheel stanchions. When the car is used for transporting trailers the treadway areas located adjacent the sills of the car are preferably retained substantially planar so as to permit the positioning of the wheels of the semi-trailer thereon.

The containers are generally mounted on the car by means of container support brackets which are engageable with the respective corner brackets on the underside of the containers. These container corner brackets overlie the treadway areas so that the container support brackets must be located therein. Heretofore, problems have been encountered in mounting these container supports in a manner permitting ready storage thereof when they are not utilized, as during the use of the car for semi-trailer transporting. The mounting structures of the container supports have generally been constructed such that the planar treadway surface has been interrupted, thereby to create elevations interfering with the transporting of semi-trailers.

Summary of the invention

It is an object of the present invention to eliminate the difficulties encountered heretofore. This is accomplished by providing a container or cargo supporting structure which is arranged so as to be tiltable or turnable into an opening in the treadway area of the car between a use position and a non-use or stored position. In the non-use position the container mounting arrangement is constructed so as to provide a substantially coplanar surface with the treadway area of the car.

The cargo supporting arrangement is further constructed and arranged so as to permit the ready installation and removal of the container support bracket from the railway vehicle.

A further feature of the invention is the ease with which the container support arrangement may be moved between its operative cargo supporting position and the stored position thereof.

Brief description of the drawings

FIG. 1 is a fragmentary top plan view of a railway car incorporating the container supporting arrangement of the present invention;

FIG. 2 is a side view taken generally along the lines 2—2 of FIG. 1 showing in particular the structure of one of the container supporting assemblies with some of the parts broken away to show underlying details of the structure;

FIG. 3 is a top plan view of FIG. 2;

FIG. 4 is a fragmentary end elevational view of the container support assembly showing the cushioning structure incorporated therein in a position when the railway car has been subjected to a longitudinal impact;

FIG. 5 is a cross sectional view taken through the well opening at the right end of the container support assembly, as viewed in FIG. 3, with some of the parts broken away to show underlying details of the structure; and FIG. 6 is a cross sectional view taken through the well opening at the left end of the container support assembly as viewed in FIG. 3.

Description of the preferred embodiment

Referring now to the drawings, there is shown in FIG. 1 and all-purpose railway freight flat car 10 of the type which is employed for transporting semi-trailers, containers and other categories of cargo. The railway freight car 10 comprises generally an underframe 11 including a center sill 12 on the respective ends of which there is mounted the conventional couplers 13. The underframe 11 includes the usual bolsters and cross-bearers, both not shown, to the respective ends of which there is fixed a side sill 14. Supported on the cross bearers and bolsters by way of stringers, not shown, extending between the side sills 14 is a floor or deck 16 preferably formed of metal sheeting.

Mounted on the floor intermediate the side sills of the car are lengthwise spaced fifth wheel stanchions which are movable between a collapsed stored position lying on the floor to an erect position for hitching semi-trailers thereon by way of attachment to the semi-trailer king pin. For a more detailed description of the type of stanchion which may be employed, reference is made to the U.S. Patent No. 3,358,955 issued on Dec. 19, 1967, assigned to the assignee of the present invention.

Adjacent each of the side sills 14 the floor 16 is constructed so as to provide substantial planar treadway areas 17 extending lengthwise thereof to accommodate the wheels of the semi-trailers thereon. Preferably the treadway areas 17 are constructed so as to eliminate any elevated structures such as raised ramp boards and the like to facilitate the positioning of the semi-trailers on the railway vehicle 10 by either circus style or crane loading.

To transport containers on the car there is provided a plurality of container support assemblies 18. The container support assemblies 18 are disposed on the car so as to be engageable with the usual corner brackets found on the lower four corners of a container and are required to be located in the treadway areas 17 along which the wheels of the semi-trailers rest or are positioned during transit.

In accordance with the present invention the container support assemblies 18 are mounted on the railway vehicle 10 so as to provide a surface substantially coplanar with the deck in an inoperative or stored position.

As shown, in particular in FIGS. 2 through 6, the container support assemblies 18 are each mounted in respective wells 19 formed in the floor structure. The wells each include opening or cutout 19' of substantially rectangular contour formed in the treadway area 17. Extending along the sides of the cutout are longitudinally extending and transversely spaced channel members 21 and 22 of which one of the channel members 21 is disposed adjacent to the side sill 14 and the other, channel 22, inboard thereof. The channel members at the respective ends thereof may be fixed to suitable transversely extending members such as cross-bearers or the like which are fixed to the center sill so that the vertical load imposed on the container support assembly 18 by the weight of the container may be transferred to the center sill. As shown in FIG. 5, upper horizontal webs 23 and 24 of the channels are fixed to the underside of the treadway area 17 so that the latter assumes the shear stresses imposed on the container support assembly 18.

The container support assemblies 18 each comprise a support bracket 26 which, as shown, is a channel member of substantially U-shaped section including a pair of upright side webs 27—27 extending from a horizontal base web 28.

Fixed to the side webs 27 adjacent the base web 28 of the channel member 26 are trunnions 29. The trunnions are each formed by a tubular member 31 within which there is concentrically disposed a disc 32 of lesser diameter than the inner diameter of the tubular member 31. Fixing the tubular member 31 and disc 32 to the side web 27 is a weld 33 which is applied between the annular space defined by the disc 32 and the inner diameter of the tubular member 31. The trunnions 29 are turnably received in respective open ended U-shaped slots 34 provided in the upper end of the longitudinally extending well channels 21 and 22. Thus, the bracket support is rockable or turnable in a vertical plane about the trunnions so that the base web 28 in one position thereof is disposed beneath the floor 17 and in another position lies substantially coplanar therewith as shown in phantom in FIG. 6.

Mounted on the support bracket 26 in the embodiment, as shown, is a container indexing and fastening head which serves to tie the container on the vehicle in a manner to cushion the force of the longitudinal impacts. The cushioning means may comprise an arrangement similar to that disclosed in the copending application Ser. No. 558,812, dated June 20, 1966, now United States Patent No. 3,401,648 granted Sept. 17, 1968, in the name of Jack E. Gutridge and assigned to the assignee of the present invention. The cushioning means includes a pair of vertically disposed elastomeric block assemblies 37 and 37a of substantially identical structure and having a rectangular elastomeric block 38 of generally rectangular section. The lower surface of the block 38 is suitably adhered or fixed to a plate 39 and the upper surface is adhered to a plate 41. The bottom plate 39 of the lower elastomeric block 37a is suitably fixed as by rivets to the base web 28 of the support bracket 26. The upper plate 41 of the lower block assembly 37a is fixed to a plate 42 which is common and fixed to the lower plate 39 of the upper block assembly 37. The upper plate 41 of the upper block assembly 37 is fixed as by rivets to a horizontal plate 43 which, as shown for example in FIG. 5, engages inwardly extending flanges 44 projecting from the side webs of the support bracket.

The intermediate plate 41 and upper plate 44 are of greater width than the elastomeric block plates 39 and 42 and provide side flanges 46 which overlie longitudinally extending guide bars 47 and 48 fixed to the respective side webs 27. As shown, the guide bars 47 and 48 are fixed to side webs 27—27 by welds applied through longitudinally spaced openigs 49 formed in the side webs 27. tudinally spaced openings 49 formed in the side webs 27. The upper guide bars 47 are vertically spaced from the upper plate 43 substantially twice the distance as the intermediate plate 42 is vertically spaced from the lower guide bars 48.

Thus upon the application of a vertical load on the block assemblies 37 and 37a by the containers, the elastomeric blocks 38 are compressed and the plates 43 and 42 and the flanges 46 thereon are disposed in the same relative vertical spacing with respect to the guide bars 47 and 48 as shown in phantom on FIG. 5.

Mounted on the upper plate 43 of each of the cushion assemblies 37 is an indexing and locking assembly 51 which engages and coacts with the corner brackets of the container. The indexing and locking assemblies each comprise an inverted U-shaped channel 55 extending lengthwise of the upper plate 43. The channel member 55 is fixed to the upper plate 43 by means of welding applied to the terminal ends of vertical webs 53. Turnably supported intermediate the ends of the channel member is a locking and indexing head 52 of substantially frustrum shape from the lower side of which there extends a shaft 53'. The shaft 53' is journalled in a collar 54 fixed to the horizontal web 56 of the channel member 55 and extending through an opening 57 formed in the latter. Fixed to the shaft 53' is a handle 58 formed from a strap having a horizontally extending portion 59 from which there projects an L-shaped handle section 61. The handle is constructed so as to be flexible in a vertical plane. Holding the horizontally extending portion 58 of the handle against a washer 63 fixed to the underside of the web 56 is a spacer collar 64.

For holding the handle 58 and thereby the indexing and locking head 52 in its indexing position, as shown, and a locked position, turned at right angles, is an indexing plate 62 fixed across the end of the channel. The lower edge of the indexing plate 62 is vertically spaced from the upper edge of a reinforcing end cap 66 so as to define a handle slot 67 into which the horizontal handle portion 59 is flexed to turn the head 52 from one position to the other.

For maintaining each of the respective container mounting assemblies 18 in the inoperative and stored position, there is provided a latching arrangement at each end of the support bracket. At the right end, as viewed in FIGS. 2 and 3, the latching arrangement comprises a keeper plate 68 which is fixed to the underside of the floor 18 adjacent the end of the well opening 19. Mounted on the horizontal base web 28 of the bracket 26 is a spring biased latch plate 69 which is supported for lengthwise sliding movement of the base by means of a top horizontal web 71 of an angle shaped latch housing plate 72. The latch plate 69 is formed with inwardly extending ear portions 73' which underline the underside of the horizontally extending lower guide bars 48.

Threaded into the inboard end of the latch plate 69 is a bolt 74 of which the shank extends through an opening 76 in a vertical web 77 of the angle latch housing plate 72. Fixed to the inner side of the shank is a washer against which there abuts one end of the biasing spring 73 which engages at its other end the inboard face of the latch plate 69 to resiliently bias the latter into latching engagement beneath the keeper plate 68. The latching arrangement at the other end of the assembly includes a horizontal stop plate 78 which is fixed between the bracket side webs 27—27, as shown in particular in FIGS. 2, 3 and 6. The plate 78 engages the underside of a keeper plate 79 constructed similarly to the keeper plate 68. To retract the latch plate 69 out of engagement with the underside of the keeper plate 68 when the assembly is in its operative position, as shown in FIG. 2, a pry bar or the like is inserted in a cut-out 81 formed in the keeper plate 68 and engages with the leading edge of the latch plate 69 and a force is exerted so as to overcome the force of the biasing spring 69 to move the latter from the position underlying the keeper plates 68. The assembly then is free to be rotated counterclockwise, as viewed in FIG. 5, about the trunnions 29 until the plate 78 on the opposite end engages the keeper plate 68 and the latch plate 69 engages under the keeper plate 79. In this position it is to be noted that the horizontal base web 28 of the bracket 26 lies substantially coplanar with the floor 16 or planar surface of the treadway area 17 of the car, as shown in FIG. 6.

To return the container mounting assembly 18 to its operative position, a pry bar is inserted in a cut-out 82 formed in the keeper 79 and the assembly turned clockwise about the trunnions to the position shown in FIG. 2. It is to be noted that when the assembly is disposed in an angular position within the well 19 for turning, the latter may be easily lifted out of open end journals 33 and removed from the car 18. This feature facilitates the repair and installation of the cushion unit.

A set of four container support assemblies 18 are utilized to mount and fasten a container on the railway vehicle 10. The assemblies 18 are positioned as shown in full lines in FIGS. 2 and 3 with the container mounting heads 52 in the indexing position. When the container mounting assemblies 18 are in the operative position, the trailer hitches located in the central area of the vehicle 10 are in a stored collapsed position on the floor 16.

The container to be transported is then lowered onto the car by means of the usual crane or the like and the corner brackets thereof are located over the heads 52 which are received in the openings formed in the container corner brackets. Thereafter, the handle 61 is depressed downwardly so that the horizontal strap 59 lies within the slot 67 and turned to rotate the head 52 to a position overlying the bottom web of the container corner brackets to fasten the container on the assemblies 18.

When a container is positioned on the assemblies 18 the elastomeric block assemblies 38 are compressed so that the upper plate 43 and intermediate plate 42 are displaced toward the guide plates 47 and 48, respectively. Upon the application of a longitudinally applied impact the elastomeric blocks are elongated in shear and the ledges 46 on the plates 42 and 43 frictionally engage the guide bars 47 and 48. During such elongation of the elastomeric blocks and the frictional contact of the plates 42 and 43 with the guide bars 47 and 48, he cushioning structure serves to absorb a portion of the impact energy thereby to protect the container and the lading carried therein.

We claim:
1. In a railway vehicle of the flat deck type having substantially planar treadway area extending lengthwise of the vehicle adjacent the side sills thereof, a cargo supporting arrangement disposed in said planar treadway area, said cargo supporting arrangement comprising an opening formed in said planar treadway area, a support bracket having a planar web which is shaped substantially complementary to said openings, cargo supporting means on said support bracket, pivot means mounting said support bracket for turning movement within said opening to a position below said planar treadway area when said cargo supporting means is in an operative cargo supporting position and a position substantially coplanar with said planar treadway area when said cargo support means is in a stored position beneath said deck, said pivot means being below the planar treadway area a distance substantially equal to the distance from the pivot means to the planar web.

2. The invention as defined in claim 1 wherein said pivot means is located intermediate the ends of said support bracket.

3. In a railway vehicle of the flat deck type having substantially planar treadway area extending lengthwise of the vehicle adjacent the side sills thereof, a cargo suporting arrangement disposed in said planar treadway area, said cargo supporting arrangement comprising an opening formed in said planar treadway area, a support bracket having a planar web which is shaped substantially complementary to said opening, cargo supporting means on said support bracket, means mounting said support bracket for turning movement within said opening to a position below said planar treadway area when said cargo supporting means is in an operative cargo supporting position and a position substantially coplanar with said planar treadway area when said cargo support means is in a stored position beneath said deck,
   wherein said mounting means is located intermediate the ends of said support bracket,
   wherein coacting latch means are mounted on each end of said opening and said support bracket to retain said planar web in said position below said treadway area and in said position coplanar with said treadway area.

4. In a railway vehicle of the flat deck type having substantially planar treadway area extending lengthwise of the vehicle adjacent the side sills thereof, a cargo supporting arrangement disposed in said planar treadway area, said cargo supporting arrangement comprising an opening formed in said planar treadway area, a support bracket having a planar web which is shaped substantially complementary to said opening, cargo supporting means on said support bracket, means mounting said support bracket for turning movement within said opening to a position below said planar treadway area when said cargo supporting means is in an operative cargo supporting position and a position substantially coplanar with said planar treadway are when said cargo support means is in a stored position beneath said deck,
   wherein said mounting means is located intermediate the ends of said support bracket,
   wherein coacting latch means are mounted on each end of said opening and said support bracket to retain said planar web in said position below said treadway area and in said position coplanar with said treadway area.
   wherein said latch means comprises a keeper plate fixed to said floor at the respective ends of said opening, a spring biased latch plate mounted on one end of said planar web, and a plate fixed on the other end of said planar web.

5. In a railway vehicle of the flat deck type having substantially planar treadway area extending lengthwise of the vehicle adjacent the side sills thereof, a cargo supporting arrangement disposed in said planar treadway area, said cargo supporting arrangement comprising an opening formed in said planar treadway area, a support bracket having a planar web which is shaped substantially complementary to said opening, cargo supporting means on said support bracket, means mounting said support bracket for turning movement within said opening to a position below said planar treadway area when said cargo supporting means is in an operative cargo supporting position and a position substantially coplanar with said planar treadway area when said cargo support means is in a stored position beneath said deck,
   wherein said mounting means is located intermediate the ends of said support bracket,
   wherein coacting latch means are mounted on each end of said opening and said support bracket to retain said planar web in said position below said treadway area and in said position coplanar with said treadway area,
   wherein said opening is defined by a pair of lengthwise extending members, and wherein said mounting means comprises an open ended journal formed in each of said members, and trunnions fixed to said bracket support journaled in said open ended journals.

6. In a railway vehicle of the flat deck type having a floor including substantially planar treadway area extending lengthwise of the vehicle adjacent the side sills thereof, a cargo supporting arrangement comprising a well formed in said treadway area of said floor, said well being defined by an opening, a pair of transversely spaced support members extending lengthwise of said opening along the underside of said floor, journal means formed in said lengthwise extending members, a support bracket disposed in said well and having a horizontal web and a pair of upstanding legs, trunnions fixed to said upstanding legs and seatable within said journal means so as to be turnable from a position in which said horizontal web is disposed below said floor and a position coplanar with said floor, and coacting latch means mounted on said floor and said support bracket for releasably latching said bracket with said horizontal web in one of said positions, and container securing means on the side of the support bracket opposite the horizontal web whereby when the support bracket is in the operative position the container securing means is operative and the horizontal web is disposed below the floor treadway area and when the support bracket is moved to the inoperative position the horizontal web is substantially coplanar with said floor treadway area.

7. In a railway vehicle of the flat deck type having substantially planar treadway area extending lengthwise of the vehicle adjacent the side sills thereof, a cargo supporting arrangement disposed in said planar treadway area, said cargo supporting arrangement comprising an opening formed in said planar treadway area, a support bracket having a planar web which is shaped substantially complementary to said opening, cargo supporting means on said support bracket, means mounting said support bracket for turning movement within said opening to a position below said planar treadway area when said cargo supporting means is in an operative cargo supporting position and a position substantially coplanar with said planar treadway area when said cargo support means is in a stored position beneath said deck,
 wherein said mounting means is located intermediate the ends of said support bracket,
 wherein coacting latch means are mounted on each end of said opening and said support bracket to retain said planar web in said position below said treadway area and in said position coplanar with said treadway area,
 wherein a cargo supporting means for mounting and attaching cargo on said vehicle is supported on said bracket, and wherein cushioning means is interposed between said cargo supporting means and said support bracket for cushioning the longitudinal impacts applied on said vehicle.

8. In a railway vehicle of the flat deck type having a floor including substantially planar treadway area extending lengthwise of the vehicle adjacent the side sills thereof, a cargo supporting arrangement comprising a well formed in said treadway area of said floor, said well being defined by an opening, a pair of transversely spaced support members extending lengthwise of said opening along the underside of said floor, journal means formed in said lengthwise extending members, a support bracket disposed in said well and having a horizontal web and a pair of upstanding legs, trunnions fixed to said upstanding legs and seatable within said journal means so as to be turnable from a position in which said horizontal web is disposed below said floor and a position coplanar with said floor, said pivot means being below the planar treadway area a distance substantially equal to the distance from the pivot means to the planar web and container securing means on the side of the support bracket opposite the horizontal web whereby when the support bracket is in the operative position the container securing means is operative and the horizontal web is disposed below the floor treadway area and when the support bracket is moved to the inoperative position the horizontal web is substantially coplanar with said floor treadway area.

9. The invention according to claim 8, and coacting latch means mounted on said floor and said support bracket for releasably latching said bracket with said horizontal web in one of said positions.

References Cited

UNITED STATES PATENTS

| | | | |
|---|---|---|---|
| 1,102,773 | 7/1914 | Martin | 105—368 X |
| 2,159,479 | 5/1939 | Goodwin et al. | 105—368 X |
| 3,085,518 | 4/1963 | Szczepanik et al. | 105—366 |

DRAYTON E. HOFFMAN, *Primary Examiner.*

U.S. Cl. X.R.

248—119